(12) United States Patent
Nariai et al.

(10) Patent No.: US 8,985,754 B2
(45) Date of Patent: Mar. 24, 2015

(54) LIQUID CONTAINER AND LIQUID CONTAINER SET

(71) Applicant: Seiko Epson Corporation, Tokyo (JP)

(72) Inventors: Maki Nariai, Shiojiri (JP); Atsushi Denda, Chino (JP); Naoki Koike, Matsumoto (JP); Takayoshi Kagata, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/097,418

(22) Filed: Dec. 5, 2013

(65) Prior Publication Data

US 2014/0168326 A1    Jun. 19, 2014

(30) Foreign Application Priority Data

Dec. 18, 2012  (JP) .................... 2012-275561

(51) Int. Cl.
| | | |
|---|---|---|
| *G01D 11/00* | (2006.01) | |
| *C09C 1/62* | (2006.01) | |
| *B41J 2/175* | (2006.01) | |
| *B41J 2/21* | (2006.01) | |

(52) U.S. Cl.
CPC ............ *B41J 2/17553* (2013.01); *B41J 2/2107* (2013.01); *B41J 2002/17516* (2013.01)
USPC .......................................... 347/100; 106/403

(58) Field of Classification Search
USPC ......... 347/86, 100; 106/31.6, 31.65, 400, 403
See application file for complete search history.

(56) References Cited

U.S. PATENT DOCUMENTS

| | | | |
|---|---|---|---|
| 5,755,861 A * | 5/1998 | Fujioka et al. ............. | 106/31.27 |
| 6,497,759 B1 * | 12/2002 | Yoshimura et al. ........ | 106/31.65 |
| 6,863,718 B2 * | 3/2005 | Lamborn et al. ........... | 106/14.12 |
| 7,419,538 B2 | 9/2008 | Li et al. | |
| 8,088,859 B2 | 1/2012 | Kagata et al. | |
| 8,192,538 B2 * | 6/2012 | Oyanagi et al. ............. | 106/31.6 |
| 8,431,630 B2 | 4/2013 | Sano et al. | |
| 2008/0145628 A1 | 6/2008 | Oyanagi et al. | |
| 2008/0182085 A1 | 7/2008 | Oyanagi et al. | |
| 2008/0314284 A1 | 12/2008 | Li et al. | |
| 2010/0256284 A1 | 10/2010 | Kagata et al. | |

FOREIGN PATENT DOCUMENTS

| | | |
|---|---|---|
| JP | 2915874 B2 | 7/1999 |
| JP | 2002-088274 A | 3/2002 |
| JP | 2003041150 A | 2/2003 |
| JP | 2004-131542 A | 4/2004 |
| JP | 2006-199920 A | 8/2006 |
| JP | 2008-174712 A | 7/2008 |
| JP | 2008-208330 A | 9/2008 |
| JP | 2010-202815 A | 9/2010 |
| JP | 2010-241976 A | 10/2010 |
| JP | 2011-132483 A | 7/2011 |

* cited by examiner

*Primary Examiner* — Anh T. N. Vo
(74) *Attorney, Agent, or Firm* — Harness, Dickey & Pierce, P.L.C.

(57) ABSTRACT

A liquid container may be connected to a liquid consuming unit. The liquid container includes an ink holder containing an ink composition, and an ink delivering portion through which the ink composition flows out of the ink holder. The ink composition contains an aqueous medium and a water-resistant metal pigment that includes pigment particles whose surfaces are covered with a coating and reacts with the aqueous medium to generate hydrogen gas. The amount of hydrogen gas generated per day from the ink composition in the ink holder is lower than or equal to the amount of hydrogen gas permeating per day through the ink holder, in an environment of 25° C.

18 Claims, 3 Drawing Sheets

LIQUID CONTAINER AND LIQUID CONTAINER SET

Priority is claimed under 35 U.S.C. §119 to Japanese Application No. 2012-275561 filed on Dec. 18, 2012, which is hereby incorporated by reference in its entirety.

BACKGROUND

1. Technical Field

The present invention relates to a liquid container and a liquid container set.

2. Related Art

To form a coating having metallic gloss on a printed article, some techniques have been used, such as foil stamping using a printing ink containing metal powder of, for example, brass or aluminum particles as a pigment, and thermal transfer using a metal foil.

Ink jet recording techniques have recently been used for printing in many cases. Metallic printing is one example of such cases, and inks that can form metal-glossy images are being developed. For example, JP-A-2008-174712 discloses an aluminum pigment dispersion containing an organic solvent such as alkylene glycol, and a non-aqueous ink composition containing the aluminum pigment dispersion.

On the other hand, in practice, aqueous ink compositions containing an aqueous medium are more highly desired than non-aqueous ink compositions containing an organic solvent from the viewpoint of global environment and human safety. However, if a metal pigment is dispersed in water, the surfaces of the particles of the pigment are sometimes tarnished due to deterioration or consumption cause by reaction with water.

To solve this issue, for example, JP-A-2011-132483 discloses a water-resistant aluminum pigment dispersion prepared by dispersing a water-resistant aluminum pigment whose surfaces are covered with a coating of silica or the like in an aqueous solution of a surfactant.

However, even though the surfaces of the pigment particles are covered with a coating, the reaction of the pigment with water cannot sufficiently be prevented and may cause hydrogen gas to be generated. In this instance, if an ink composition prepared by dispersing the pigment in an aqueous medium is stored in an air-tight container (for example, in an ink cartridge), the container may be seriously deformed or broken.

SUMMARY

Accordingly, an advantage of some aspects of the invention is that it provides a liquid container that is prevented from being broken by a reaction of the liquid in the container even if the liquid is an ink composition containing a metal pigment and an aqueous medium.

The following embodiments can solve at least part of the issue described above.

Application 1

According to an aspect of the invention, a liquid container is provided which can be connected to a liquid consuming unit. The liquid container includes an ink composition, an ink holder containing the ink composition, and an ink delivering portion through which the ink composition flows out of the ink holder. The ink composition contains a water-resistant metal pigment containing pigment particles whose surfaces are covered with a coating, and an aqueous medium. The metal pigment reacts with the aqueous medium to generate hydrogen gas. The amount of hydrogen generated per day from the ink composition in the ink holder is lower than or equal to the amount of hydrogen gas permeating per day through the ink holder, in an environment of 25° C.

In the liquid container, even if hydrogen gas is generated in the container by a reaction of the metal pigment with the aqueous medium in the ink composition, the hydrogen gas can be discharged from the ink holder. Consequently, the liquid container is prevented from being broken by the generation of hydrogen gas.

Application 2

The amount of generated hydrogen measured by the Archimedian method may be in the range of 0.01 to 2 $cm^3 \cdot day^{-1}$.

Application 3

In the ink holder, the water content in the ink composition may be reduced by 0.01% to 0.05% per day at 25° C., relative to the initial water content on a mass basis immediately after the ink holder is charged with the ink composition.

Application 4

The ink holder may be formed, at least in part, with a film having a thickness in the range of 50 to 300 µm without including an aluminum layer having a thickness of more than 5 µm.

Application 5

The film may include a layer that allows water to permeate therethrough in an amount in the range of 0.0001 to 0.0032 $mL/cm^2$ per day at 25° C., and allows hydrogen to permeate in an amount in the range of 0.005 to 0.15 $mL/cm^2$ per day at 25° C.

Application 6

The film may include a polyethylene layer and a nylon layer.

Application 7

The film including the polyethylene and nylon layers may further include an aluminum oxide layer or an ethylene-vinyl acetate copolymer layer.

Application 8

The particles of the metal pigment may have a 50% average particle size of 0.3 µm or more in terms of equivalent circle diameter. In this instance, the ink composition occupies the ink holder with a maximum occupation rate of 95% or less relative to the capacity of the ink holder.

Application 9

According to another aspect of the invention, a liquid container set is provided which includes the above-described liquid container and a color liquid container. The color liquid container includes a color ink composition, a color ink holder containing the color ink composition, and a color ink delivering portion through which the color ink composition flows out of the color ink holder. The color ink composition contains a pigment having an average particle size of 200 nm or less or a dye, and a medium.

Application 10

The color ink holder may be formed, at least in part, with a film including an aluminum layer having a thickness of 5 µm or more.

Application 11

The ink composition occupies the ink holder with an occupation rate relative to the capacity of the ink holder, and the color ink composition occupies the color ink holder with an occupation rate relative to the capacity of the color ink holder. In this instance, the maximum occupation rate of the color ink composition in the color ink holder may be higher than the maximum occupation rate of the ink composition in the ink holder.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
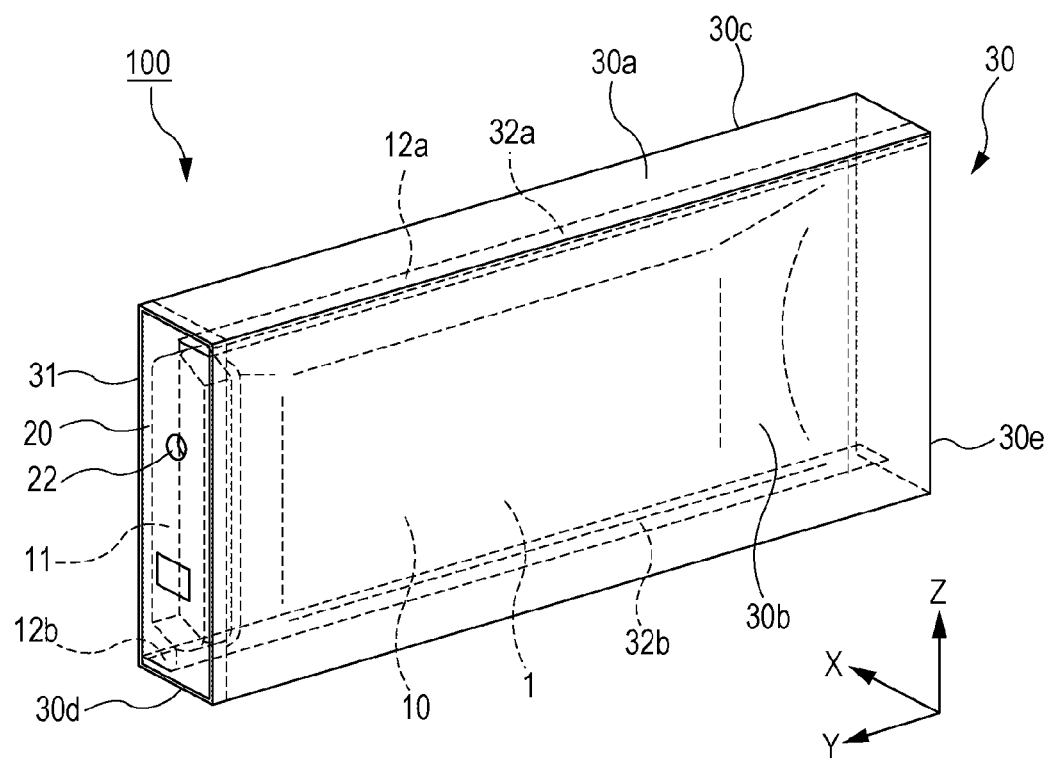
FIG. 1 is a schematic perspective view of a liquid container according to an embodiment of the invention.

Preferred embodiments of the invention will now be described. The following embodiments will be described by way of example. The invention is not limited to the disclosed embodiments, and various modifications may be made within the scope and spirit of the invention. Also, all the components disclosed in the following embodiments are not required for the invention.

1. Liquid Container

In an embodiment of the invention, the liquid container can be connected to a liquid consuming unit. The liquid container includes an ink holder containing an ink composition, and an ink delivering portion through which the ink composition flows out of the ink holder. The ink composition contains a water-resistant metal pigment containing pigment particles whose surfaces are covered with a coating, and an aqueous medium. The metal pigment reacts with the aqueous medium to generate hydrogen gas. In an environment of 25° C., the amount $A_{H2}$ of hydrogen generated per day from the ink composition in the ink holder is lower than or equal to the amount $B_{H2}$ of hydrogen gas permeating per day through the ink holder.

The liquid container will now be described in detail in this order: the structure of the liquid container, the ink composition contained in the liquid container, and preparation of the ink composition.

1.1. Structure of Liquid Container

The structure of the liquid container of an embodiment will be described with reference to FIGS. 1 to 4. The structure of the liquid container described below is merely one of the possible embodiments and is not intended to limit the invention.

For the sake of easy understanding, the dimensional proportions of the members or components of the liquid container shown in the drawings may be varied as needed. For the sake of easy understanding, each drawing is provided with three orthogonal axes X, Y and Z. The directions of these axes are the same among the drawings.

1.1.1. Structure

Figure 2:
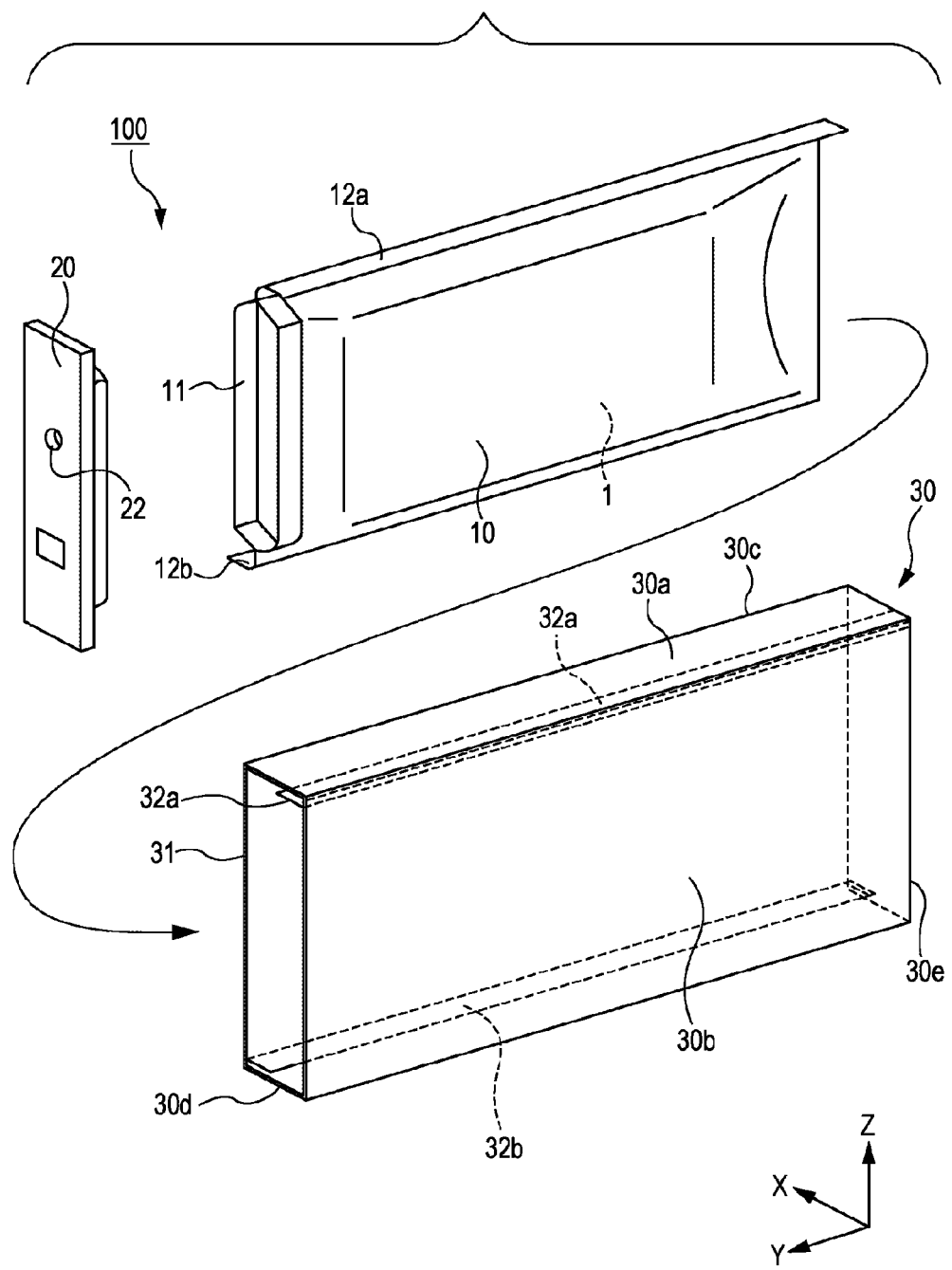
FIG. 2 is a schematic exploded perspective view of a liquid container according to an embodiment of the invention.

First, an ink cartridge will be described as an example of the liquid container. FIG. 1 is a perspective view of the ink cartridge 100. FIG. 2 is a schematic exploded perspective view of the ink cartridge 100.

In FIGS. 1 and 2, the Z axis extends in the vertical direction, the Y axis extends in the longitudinal direction of the ink cartridge 100, and the X axis extends in the direction perpendicular to the Y and Z axes. The positive (+) direction of the Z axis is upward.

In an embodiment of the invention, the liquid container includes an ink holder containing an ink composition described later, and an ink delivering portion through which the ink composition flows out of the ink holder. More specifically, in the embodiment shown in FIGS. 1 and 2, the ink cartridge 100 includes an ink bag 10 containing an ink composition described later, a flow channel member 20 defining an ink delivering portion, and an enclosure 30 housing the ink bag 10. In the embodiment shown in FIGS. 1 and 2, the ink cartridge 100 has, but not limited to, a rectangular parallelepiped shape with a length in the Y direction and a width in the X direction.

Preferably, the ink holder, or the ink bag 10, has at least one flexible face. The flexible face allows the capacity of the ink holder to decrease with the flowing ink composition from the ink holder, thus accelerating the flow of the ink composition. In the embodiment shown in FIG. 2, the ink bag 10 has a shape that can be charged with an ink 1 (ink composition described later), and is defined by flexible faces. More specifically, the ink bag 10 is a pillow-shaped packing bag and has an opening 11 to be connected to the flow channel member 20 and sealed portions 12a and 12b at the top and bottom thereof.

The ink holder may be formed, at least in part, with a film. The use of a film facilitates the formation of a flexible face. In the embodiment shown in FIG. 2, all the faces of the ink bag 10 are defined by a film. Consequently, the capacity of the ink bag decreases easily as the ink 1 flows out of the ink bag 10. Thus, the ink can flow out smoothly.

The thickness of the film forming the ink holder is preferably in the range of 50 to 300 μm, more preferably 50 to 200 μm. If the thickness of the film is 50 μm or more, the capacity of the ink holder can be reduced without shrinking the ink holder itself, by drawing the ink so as to be discharged from the ink holder. Thus, the ink can be satisfactorily discharged from the ink holder. Also, a film having a thickness of 300 μm or less can form an ink holder having such an appropriate rigidity as the ink is satisfactorily agitated in the ink holder by shaking the liquid container.

The ink holder disclosed in JP-A-2009-184318 is also a bag. However, for an ink composition containing a pigment liable to settle down, such as a metal pigment as used in an embodiment of the invention, the rigidity of the ink holder is desirably as low as possible. Accordingly, the thickness of the film is preferably in the range of 50 to 150 μm.

The film of the ink holder can be made of, but is not limited to, nylon, polyethylene, polypropylene, aluminum, aluminum oxide, or ethylene-vinyl acetate copolymer. The film may include one or more layers made of any of these materials.

If the film has a two layers, the two layers may be bonded together with an adhesive or the like or by heating. Alternatively, one of the two layers may be formed on the other layer by vapor deposition.

A film having an aluminum layer formed by vapor deposition as disclosed in JP-A-2008-12762 is much superior in gas barrier property (ability of preventing gas from permeating) and water-vapor barrier property (ability of preventing water vapor from permeating) to polyethylene films not having a vapor-deposited aluminum layer. Accordingly, the thickness of the aluminum layer of the film forming the ink holder is preferably 5 μm or less, more preferably 1 μm or less. Still more preferably, the film does not have an aluminum layer. Such a film not having an aluminum layer of more than 5 μm in thickness allows the hydrogen gas generated in the ink holder to discharge easily from the ink holder, thus preventing the ink holder from expanding and breaking. The thickness of aluminum layer of "5 μm or less" or "1 μm or less" implies that it may be 0 μm; hence, it is implies that the film may not have an aluminum layer.

Preferably, the film forming the ink holder includes a layer that allows water (water vapor) to permeate therethrough in an amount in the range of 0.0001 to 0.0032 mL/cm$^2$ per day at 25° C., and allows hydrogen to permeate therethrough in an amount in the range of 0.005 to 0.15 mL/cm$^2$ per day at 25° C. Such a film allows the hydrogen generated in the ink holder to discharge from the ink holder while helping the ink composition in the ink holder maintain the water content. Thus, the liquid container helps stably storage of the ink composition and prevents the breakage and other problems of the ink holder. For example, aluminum oxide is one of the materials that can form the film having the above-described desired properties.

Preferably, the film forming the ink holder includes a polyethylene layer and a nylon layer. Since these layers have high hydrogen gas permeability, hydrogen gas generated in the ink holder can discharge from the ink holder. Consequently, the ink holder can be prevented from expanding and breaking.

Preferably, the film forming the ink holder further includes an aluminum oxide layer or an ethylene-vinyl acetate copolymer layer, in addition to the polyethylene and nylon layers. The polyethylene and nylon layers have high water (vapor) permeabilities as well as high hydrogen gas permeabilities. Accordingly, a film composed of only a polyethylene and a nylon layer may cause a decrease in the water content of the ink composition in the ink holder, thus causing ejection failure of the ink composition. On the other hand, the aluminum oxide layer and the ethylene-vinyl acetate copolymer layer have low water vapor permeability while exhibiting high hydrogen permeability as with the polyethylene and nylon layers. By adding an aluminum oxide layer or an ethylene-vinyl acetate copolymer layer to the film, therefore, the ink holder can advantageously retain water therein while releasing hydrogen therefrom.

Preferably, the maximum occupation rate of the ink composition in the ink holder is 95% or less, more preferably 90% or less, relative to the capacity of the ink holder. When the occupation rate of the ink composition in the ink holder is 95% or less, the ink composition moves easily in the ink holder so that the constituents of the ink composition can be dispersed to be sufficiently blended by shaking the liquid container to agitate the ink composition in the ink holder. Particularly for metal pigments, the 50% average particle size R50 is often controlled to 0.3 μm or more in terms of equivalent circle diameter from the viewpoint of enhancing the metallic glossiness of the metal pigment. Such metal pigments tend to sediment in the ink holder. Therefore, it is preferable that the occupation rate of the ink composition in the holder be controlled to the above range so that the pigment in the ink composition can be sufficiently dispersed by agitation. The capacity of the ink holder corresponds to the amount of the ink composition fully (100%) filling the ink holder.

The capacity of the ink holder can be as large as ink holders (ink bags) used in conventional ink jet recording apparatuses. For example, it may be 30 to 1000 cm$^3$, such as 80 to 750 cm$^3$. The capacity of the ink holder mentioned herein refers to the capacity of the interior of the ink holder.

The surface area of the ink holder can be as large as ink holders (ink bags) used in conventional ink jet recording apparatuses. For example, it may be 40 to 1600 cm$^2$, such as 120 to 1200 cm$^2$. The surface area of the ink holder mentioned herein refers to the area of the surface that can come in contact with the ink composition.

In the embodiment shown in FIGS. 1 and 2, the ink delivering portion is defined by the flow channel member 20. The flow channel member 20, which is a resin block, is connected to the ink bag 10 so as to close the opening 11 of the ink bag 10. The ink bag 10 is housed in the enclosure 30 and the flow channel member 20 is secured to the opening 31 of the enclosure 30. The flow channel member 20 has a flow channel (not shown) through which an ink 1 is supplied to the ink bag 10. After being charged with the ink 1 through the flow channel, the ink bag 10 is enclosed in the enclosure 30.

Figure 3:
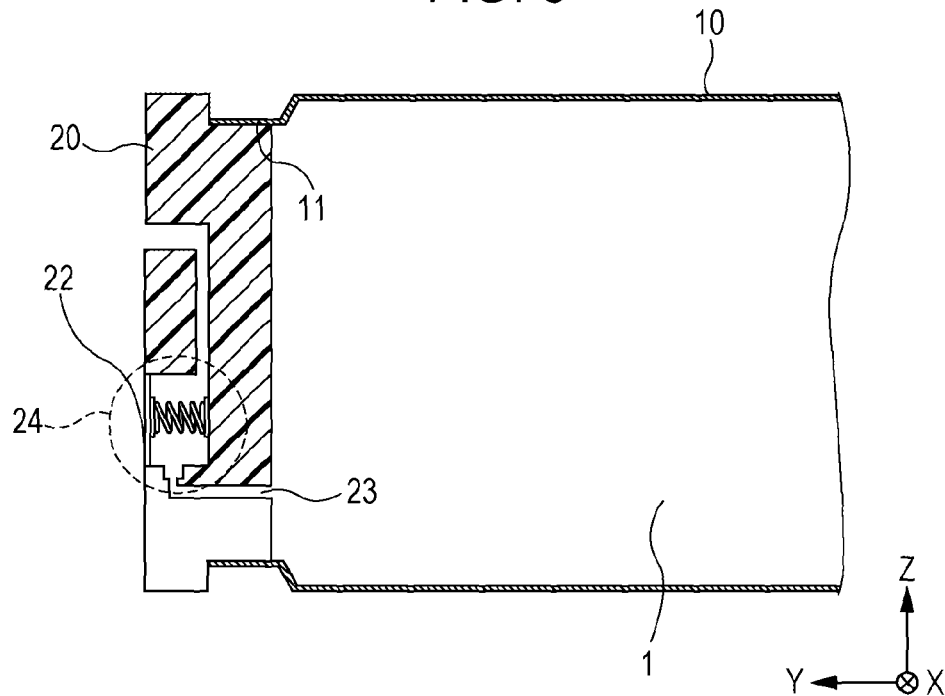
FIG. 3 is a schematic side view illustrating a connection between an ink bag and a flow-channel member of an embodiment of the invention.

FIG. 3 is a schematic side view illustrating the connection between the ink bag 10 and the flow channel member 20. As shown in FIG. 3, the flow channel member 20 has a suction port 23 through which the ink 1 is sucked into the flow channel member 20 from the ink bag 10, and an outlet 22 through which the ink 1 introduced through the suction port 23 flows out of the flow channel member 20. When the ink cartridge 100 is mounted to an ink jet recording apparatus, the ink 1 flows out of the ink bag 10 through the suction port 23 and is delivered to the ink jet recording apparatus through the outlet 22. The flow channel member 20 is provided with an ink detection mechanism 24 including a check valve between the suction port 23 and the outlet 22. When the ink cartridge 100 is not mounted to the ink jet recording apparatus, the suction port 23 is sealed with a sealing member. Any ink bag in which the entirety except the suction port or the like is blocked from communicating with the external atmosphere as in the present embodiment can solve the issue of the known art more effectively.

The enclosure 30 is a rectangular parallelepiped member made of a resin and has an open side to which the flow channel member 20 is attached. However, the shape of the enclosure is not limited to rectangular parallelepipeds. The enclosure 30 includes five faces defined by a top plate 30a, side plates 30b and 30c, a bottom plate 30d, and a back panel 30e, as shown in FIG. 2.

The enclosure 30 is also provided with retainers 32a and 32b therewithin. Retainer 32a has a width about half as large as the width of the top plate 30a, and is connected to the side plate 30b in parallel to the top plate 30a with a space therebetween. Similarly, retainer 32b has a width about half as large as the width of the bottom plate 30d, and is connected to the side plate 30c in parallel to the bottom plate 30d with a space therebetween.

Figure 4:
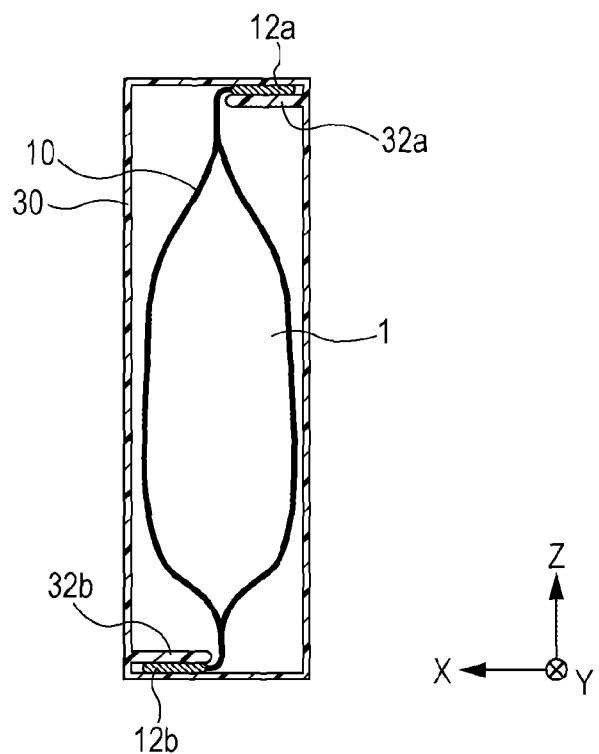
FIG. 4 is a schematic sectional view of an ink container of an embodiment in which an ink bag is enclosed in an enclosure.

FIG. 4 is a schematic sectional view of the enclosure 30 containing the ink bag 10. More specifically, the figure shows a cross section of the ink cartridge 100 shown in FIG. 1, taken along an XZ plane.

As shown in FIG. 4, sealed portion 12a of the ink bag 10 is disposed in the space above the retainer 32a of the enclosure 30, and sealed portion 12b of the ink bag 10 is disposed in the space under the retainer 32b of the enclosure 30. The ink bag 10 is thus housed in the enclosure 30.

1.1.2. Relationship Between Liquid Container and Ink Composition

In the liquid container of an embodiment, the ink composition generates hydrogen gas in an amount $A_{H2}$ per day at room temperature (25° C.). The amount $A_{H2}$ is lower than or equal to the amount $B_{H2}$ of hydrogen gas permeating through the ink holder per day at room temperature. Thus, the hydrogen gas generated in the ink holder is released to the outside, so that the ink holder is prevented from being broken by the generation of hydrogen gas and is also prevented from being deformed to the extent of being difficult to incorporate in the enclosure.

The relationship between the amount $A_{H2}$ of hydrogen gas generation in the ink holder and the amount $B_{H2}$ of hydrogen gas permeating the ink holder can be measurement by a method based on the Archimedian method. First, a graduated cylinder is prepared which contains an amount of ion exchanged water in which the entirety of the ink holder can be immersed. Immediately after being charged with the ink composition, the ink holder is completely immersed in the water in the graduated cylinder. The increased volume c1 of water at this time is recorded. Then, the ink holder is taken out of the graduated cylinder, and is subsequently kept at 25° C. for 24 hours. Then, the entirety of the ink holder is immersed again in the water in the graduated cylinder, and the increased volume c2 of water in the cylinder is recorded. When the difference between the volumes c1 and c2 is 0, it can be determined that the amount $A_{H2}$ of generated hydrogen gas is lower than or equal to the amount $B_{H2}$ of permeated hydrogen gas.

The amount $A_{H2}$ of generated hydrogen gas can be measured by the Archimedian method as described below. First, a small amount of the ink composition is placed in an ink bag that does not allow hydrogen gas to permeate therethrough, and the ink bag is sealed. Immediately after being sealed, the entirety of the ink bag is immersed in the water in the graduated cylinder, and the increased volume d1 of water in the graduated cylinder is recorded. Then, the ink bag is taken out of the graduated cylinder, and is subsequently kept at 25° C. for 24 hours. Then, the entirety of the ink bag is immersed again in the water in the graduated cylinder, and the increased volume d2 of water in the graduated cylinder is recorded. The amount d3 ($cm^3 \cdot g^{-1} \cdot day^{-1}$) of hydrogen gas generated per day from 1 g of pigment in the ink composition is calculated by dividing the difference (d2−d1) between d1 and d2 by the weight of the pigment in the ink composition in the ink bag. The amount $A_{H2}$ of generated hydrogen gas can be calculated as the product of the amount d3 of hydrogen gas generated from 1 g of pigment and the weight of the pigment contained in the ink composition in the ink holder.

The amount $A_{H2}$ of generated hydrogen is preferably in the range of 0.001 to 10 $cm^3$ per day, more preferably 0.005 to 5 $cm^3$ per day, and still more preferably 0.01 to 2 $cm^3$ per day.

In the liquid container of an embodiment of the invention, the water content of the ink composition may be reduced preferably by 0.01% to 0.50% per day, more preferably 0.01% to 0.05%, at 25° C., relative to the initial water content on a mass basis immediately after the ink holder is charged with the ink composition. Since the decrease in water content is controlled to these ranges, the ink composition can retain water sufficiently in the ink holder, thus maintaining the viscosity thereof and the state where the constituents in the ink composition are stably dispersed. Accordingly, the ink composition can be stably stored and stably ejected.

1.2. Ink Composition

The liquid container of an embodiment of the invention is charged with an ink composition containing a water-resistant metal pigment and an aqueous medium. The water-resistant metal pigment contains pigment particles whose surfaces are covered with a coating. The constituents of the ink composition will be described below.

1.2.1. Water-Resistant Metal Pigment

The water-resistant metal pigment contains particles covered with a coating.

The metal pigment exhibits metallic gloss when absorbs the medium. Examples of the material of such a metal pigment include, but are not limited to, aluminum, silver, gold, platinum, nickel, chromium, tin, zinc, indium, titanium and copper, and alloys of these metals. Among these, aluminum or an aluminum alloy is advantageous in view of metallic gloss and cost efficiency.

The pigment mentioned herein contains a plurality of pigment particles. The pigment particles are preferably flat-shaped. Flat-shaped particles can readily exhibit satisfactory metallic gloss.

Preferably, the metal pigment has a 50% average particle size R50 of 0.3 µm or more in terms of equivalent circle diameter calculated from the areas of the projections of pigment particles obtained with a particle image analyzer. Such pigment particles can exhibit satisfactory metallic gloss. Also, the metal pigment preferably has an R50 in the range of 0.5 to 3 µm, and whose particles have thicknesses Z in the range of from 1 nm to less than 100 nm. Such a metal pigment not only exhibits satisfactory metallic gloss, but also helps stable recording.

The average particle size R50 of the metal pigment is more preferably in the range of 0.5 to 1.5 µm. A metal pigment having an R50 in this range may help more stable recording.

An equivalent circle diameter is the diameter of a circle having an area equivalent to the area of the projection of a pigment particle, and can be measured by a particle image analyzer. For example, if the projection of a pigment particle is polygonal in shape, the polygonal pigment particle is projected, and the projection is converted to a circle. The diameter of the circle is the equivalent circle diameter of the polygonal pigment particle.

The area of the projection and the equivalent circle diameter, of a pigment particle of the metal pigment can be measured with a particle image analyzer. Examples of the particle image analyzer include Flow Particle Image Analyzers FPIA-2100, FPIA-3000, and FPIA-3000S (each manufactured by Sysmex). The average particle size in terms of equivalent circle diameter is number-based.

The particle size distribution (CV value) of a metal pigment can be calculated using the following equation:

$$CV \text{ value} = \text{standard deviation of particle size distribution/average particle size} \times 100$$

The CV value thus obtained is preferably 60 or less, more preferably 50 or less, and particularly preferably 40 or less. A metal pigment having a CV value of 60 or less can help stable recording.

Preferably, the maximum particle size of the metal pigment is 3 µm or less in terms of equivalent circle diameter calculated from the areas of the projections of pigment particles. The use of a metal pigment having a maximum particle size of 3 µm or less helps prevent the clogging of the nozzle apertures and ink flow channels of the ink jet recording apparatus effectively when the ink composition is used in an ink jet recording apparatus.

The particles of the metal pigment have thicknesses (Z) in the range of 10 to 50 nm, more preferably 10 to 30 nm. Such a metal pigment does not tarnish even though the particles of the metal pigment are covered with a coating.

The thickness (Z) of the pigment particles can be measured by observing the cross sections of the particles through an electron microscope. Examples of the electron microscope include a transmission electron microscope (TEM) JEM-2000 EX manufactured by JEOL, a field emission scanning electron microscope (FE-SEM) S-4700 manufactured by Hitachi, and a scanning electron microscopy (STEM) HD-2000 manufactured by Hitachi High-Technologies. The thickness (Z) mentioned herein refers to the arithmetic average of the thicknesses of ten particles arbitrarily selected from the particles of the metal pigment.

The coating formed over the particles of the metal pigment is not particularly limited as long as it can enhance the water resistance of the metal pigment. For example, the coating may be a film formed of an alkoxysilane whose molecular structure has a silicon atom, such as tetraethoxysilane, a film containing an inorganic oxide formed of polysilazane, or a film formed of a fluorine-containing material. Among these, alkoxysilane is advantageous because it can form a uniform and flat coating over the surfaces of the pigment particles.

Particularly when an aluminum pigment containing aluminum or an aluminum alloy is used, tetraethoxysilane is particularly preferred because it can form a silica coating highly adhesive to the aluminum pigment.

The coating can be formed by, but not limited to, the method disclosed in US 2010/0256284 A1 or US 2010/0256283 A1.

The coating is preferably formed to a thickness in the range of 1 to 20 nm, more preferably 3 to 10 nm, still more preferably 3 to 9 nm. A coating having a thickness in these ranges, particularly a thickness more than or equal to the lower limit of these ranges, can enhance the water resistance of the metal pigment, and a coating having a thickness lower than or equal to the upper limit can prevent the metal pigment from tarnishing and enhance the water resistance of the metal pigment.

The thickness of the coating refers to that of the coating formed on one side of the flat-shaped particle of the metal pigment in the thickness direction of the pigment particle. The thickness of the coating can be measured by observing the cross sections of the particles of the metal pigment through an electron microscope (for example, TEM, STEM, SEM, or FE-SEM).

The water-resistant metal pigment content of the ink composition is preferably 0.1% to 5.0% by mass, more preferably 0.1% to 3.0% by mass, still more preferably 0.25% to 2.5% by mass, particularly preferably 0.5% to 2.0% by mass, relative to the total mass of the ink composition.

1.2.2. Aqueous Medium

The ink composition contains an aqueous medium.

The aqueous medium is intended to disperse the metal pigment therein.

The aqueous medium mainly contains water. Preferably, the water is pure water or ultrapure water, such as ion exchanged water, ultrafiltered water, reverse osmotic water, or distilled water. More preferably, the water is sterilized, for example, by irradiation with UV light or by adding hydrogen peroxide. Such water prevents occurrence of mold and bacteria for a long time.

The aqueous medium content of the ink composition is preferably 20% by mass or more, more preferably in the range of 20% to 60% by mass, and still more preferably in the range of 40% to 60% by mass. The ink composition containing 20% by mass or more of an aqueous medium is advantageous in reducing the environmental load, and exhibits such a viscosity as to be easy to handle. In addition, if the aqueous medium content is 60% by mass or less, gas generation from or corrosion of the water-resistant metal pigment, caused by a reaction of the water-resistant metal pigment with water, can be reduced.

1.2.3. Other Constituents

Organic Solvent

In an embodiment, the ink composition may contain an organic solvent.

The organic solvent desirably has a polarity from the viewpoint of compatibility with aqueous media. Examples of the polar organic solvent include alcohols, such as methyl alcohol, ethyl alcohol, propyl alcohol, butyl alcohol, isopropyl alcohol, and fluoroalcohol; ketones, such as acetone, methyl ethyl ketone, and cyclohexanone; carboxylic acid esters, such as methyl acetate, ethyl acetate, propyl acetate, butyl acetate, methyl propionate, and ethyl propionate; ethers, such as diethyl ether, dipropyl ether, tetrahydrofuran, and dioxane; alkanediols, such as 1,2-butanediol, 1,2-pentanediol, 1,2-hexanediol, 1,2-heptanediol, 1,2-octanediol and other 1,2-alkanediols having a carbon number of 4 to 8; polyhydric alcohols, such as ethylene glycol, diethylene glycol, triethylene glycol, polyethylene glycol, polypropylene glycol, propylene glycol, butylene glycol, 1,2,6-hexanetriol, thioglycol, hexylene glycol, glycerol, trimethylolethane, and trimethylolpropane; glycol ether solvents, such as triethylene glycol monobutyl ether and other alkylene glycol monoethers and diethylene glycol diethyl ether and other alkylene glycol diethers; and pyrrolidone derivatives, such as N-methyl-2-pyrrolidone, N-ethyl-2-pyrrolidone, N-vinyl-2-pyrrolidone, 2-pyrrolidone, and 5-methyl-2-pyrrolidone.

If an aluminum pigment is used as the metal pigment, at least one organic solvent selected from the polyhydric alcohols and glycol ethers is advantageously used because these organic solvents help the aluminum pigment disperse stably.

Also, polyhydric alcohols hinder the ink composition from drying to prevent the ink composition from clogging the head of the liquid ejecting apparatus when the ink composition is used in a liquid ejecting apparatus such as an ink jet recording apparatus.

Alkanediols are also advantageous from the viewpoint of enhancing the wettability of the ink composition on the recording medium and other recording surfaces and help the ink composition penetrate the recording medium easily.

If the ink composition contains an organic solvent, its content is preferably 30% by mass or more, more preferably in the range of 30% to 80% by mass, still more preferably 40% to 80% by mass, and particularly preferably 50% to 80% by mass, relative to the total mass of the ink composition. In addition, if the organic solvent content is 30% by mass or more, the water-resistant metal pigment is prevented from reacting with water to generate gas, or the corrosion of the water-resistant metal pigment can be reduced. Also, if the organic solvent content is 80% by mass or less, the environmental load of the ink composition is advantageously reduced. In the ink composition containing 50% by mass or more of an organic solvent, the volatilization of water is reduced. Therefore, even if the film forming the ink holder does not include an aluminum layer, problems caused by the decrease in water content of the ink composition does not easily occur.

Basic Catalyst

In an embodiment, the ink composition may contain a basic catalyst. The basic catalyst can be added while the metal pigment, such as an aluminum pigment, is reacting with the material of the coating, such as tetraethoxysilane (TEOS).

Examples of the basic catalyst include ammonia, trialkylamines, ethanolamine, sodium hydroxide, potassium hydroxide, urea, choline, and tetraalkylammonium hydroxides.

Surfactant

In an embodiment, the ink composition may contain a surfactant. By adding a surfactant to the ink composition, the water-resistant metal pigment may be dispersed more sufficiently.

The surfactant may be selected from known surfactants including anionic surfactants, cationic surfactants, nonionic surfactants, amphoteric surfactants and polymer surfactants.

Preferably, the surfactant is a nonionic acetylene glycol-based or polysiloxane-based surfactant. These nonionic surfactants can enhance the wettability of the ink composition on the recording medium or other recording surfaces and help the ink composition penetrate the recording medium easily. Examples of the acetylene glycol-based surfactant include 2,4,7,9-tetramethyl-5-decyne-4,7-diol, 3,6-dimethyl-4-octyne-3,6-diol, 3,5-dimethyl-1-hexyne-3-ol, and 2,4-dimethyl-5-hexyne-3-ol. Commercially available acetylene glycol-based surfactants may be used, such as OLFINE series E1010, STG and Y (each produced by Nissin Chemical Industry); and SURFYNOL series 104, 82, 465, 485 and TG (each produced by Air Products and Chemicals Inc.) The polysiloxane-based surfactant is also commercially available. For example, BYK-347 or BYK-348 (each produced by BYK) may be used.

Tertiary Amine

Preferably, the ink composition contains a tertiary amine. The tertiary amine has an effect of steric hindrance and a function of adjusting pH, and accordingly helps the water-resistant metal pigment disperse sufficiently.

Examples of the tertiary amine include triethanolamine, tripropanolamine, tributanolamine, N,N-dimethyl-2-aminoethanol, and N,N-diethyl-2-aminoethanol. Among these, triethanolamine and tripropanolamine are advantageous from the viewpoint of further helping the metal pigment disperse in the aqueous medium, and triethanolamine is more advantageous because it can enhance the storage stability of the ink composition in addition to helping the ink composition disperse sufficiently.

If the ink composition contains a tertiary amine, its content is preferably in the range of 0.1% to 2% by mass, more preferably in the range of 0.3% to 1.8% by mass, and still more preferably in the range of 0.4% to 1.6% by mass, relative to the total mass of the ink composition. Tertiary amine with such a content tends to produce larger effects.

Resin

In an embodiment, the ink composition may contain a resin. The resin has the function of tightly fixing the water-resistant metal pigment to the recording medium. Examples of the resin include homopolymers or copolymers of acrylic acid, acrylic acid esters, methacrylic acid, methacrylic acid esters, acrylonitrile, cyanoacrylate, acrylamide, olefin, styrene, vinyl acetate, vinyl chloride, vinyl alcohol, vinyl ether, vinyl pyrrolidone, vinyl pyridine, vinyl carbazole, vinyl imidazole or vinylidene chloride; urethane resin; fluororesin; and natural resin. If a copolymer is used, the copolymer may be a random copolymer, a block copolymer, an alternating copolymer, or a graft copolymer.

pH Adjuster

In an embodiment, the ink composition may contain a pH adjuster. Examples of the pH adjuster include potassium dihydrogenphosphate, sodium dihydrogenphosphate, sodium hydroxide, lithium hydroxide, potassium hydroxide, ammonia, potassium carbonate, sodium carbonate, and sodium hydrogencarbonate.

Buffer Solution

In an embodiment, the ink composition may contain a buffer solution. The buffer solution can reduce the variation in the pH of the ink composition to keep the pH in a desired range. Consequently, problems resulting from a variation in the pH of the ink composition may be prevented, such as hydrogen gas generation caused by a reaction of the metal pigment with the aqueous medium, and leaching of the water-resistant metal pigment.

Known buffer solutions that can control the pH of the ink composition in the range of 5.0 to 8.5 can be used. Examples of such a buffer solution include Good buffers such as 4-(2-hydroxyethyl)-1-piperazineethanesulfonic acid (HEPES), morpholinoethanesulfonic acid (MES), carbamoylmethyliminobisacetic acid (ADA), piperazine-1,4-bis(2-ethanesulfonic acid) (PIPES), N-(2-acetamido)-2-aminoethanesulfonic acid (ACES), Cholamine chloride, N,N-bis(2-hydroxyethyl)-2-aminoethanesulfonic acid (BES), N-tris(hydroxymethyl)methyl-2-aminoethanesulfonic acid (TES), acetamidoglycine, tricine, glycinamide, and vicine; phosphate buffers; and tris buffers.

Other Constituents

In an embodiment, the ink composition may further contain other additives including a fixing agent such as water-soluble rosin, an antifungal agent or preservative such as sodium benzoate, an antioxidant or ultraviolet light adsorbent such as an allophanate, a chelating agent, and an oxygen absorbent. These additives may be used singly or in combination.

2. Liquid Container Set

A liquid container set including the above-described liquid container will now be described.

The liquid container set of an embodiment of the invention includes the above-described liquid container and a color liquid container. The color liquid container includes a color ink holder containing a color ink, and a color ink delivering portion through which the color ink composition flows out. The color ink composition contains a pigment having a particle size of 200 nm or less or a dye, and a medium.

The liquid container of the liquid container set is as described above, and its further description is omitted.

The color liquid container of the liquid container set will now be described. In the following description, the liquid container, the ink holder, the ink delivering portion may be often referred to as the first liquid container, the first ink holder and the first ink delivering portion, respectively. Similarly, the color liquid container, the color ink holder, and the color ink delivering portion are often referred to as the second liquid container, the second ink holder and the second ink delivering portion, respectively.

2.1. Color Liquid Container (Second Liquid Container)

In the liquid container set of an embodiment of the invention, the second liquid container includes a second ink holder containing a color ink composition, and a second ink delivering portion through which the color ink composition flows out.

In the description for the second liquid container, some of the portions having the same feature and structure as the first liquid container may be omitted.

2.1.1. Structure of Color Liquid Container (Second Liquid Container)

The second ink holder and the second ink delivering portion of the second liquid container correspond to the first ink holder and the first ink delivering portion of the first liquid container, respectively.

The second ink holder is preferably flexible from the same viewpoint as the first ink holder.

At least part of the second ink holder may be formed with a film from the same viewpoint as the first ink holder. The thickness of the film forming the second ink holder is preferably in the range of 50 to 300 μm, more preferably 50 to 200 μm, from the same viewpoint as the first ink holder.

The film of the second ink holder can be made of, but is not limited to, nylon, polyethylene, polypropylene, aluminum, aluminum oxide, or ethylene-vinyl acetate copolymer. The film may include one or more layers made of any of these materials.

The color ink composition does not contain a metal pigment, as described later. Therefore the second ink holder need not allow for the generation of hydrogen. However, if the water in the color ink composition is evaporated from the second ink holder, the color ink composition may not be stably stored or stably ejected. Accordingly, it is preferable that the film forming the second ink holder include an aluminum layer. Preferably, the film forming the second ink holder has an aluminum layer having a larger thickness than the film forming the first ink holder. More specifically, the thickness of the aluminum layer of the second ink holder is preferably 5 μm or more.

In the color ink composition, the coloring material is more difficult to settle than the metal pigment in the ink composition. Accordingly, even if the second ink composition occupies the second ink holder at a higher rate than the case where the first ink composition occupies the first ink holder, the effect of agitating the second ink holder can be satisfactorily produced. Hence, the maximum occupation rate $V_C$ of the color ink composition in the second ink holder to the capacity of the second ink holder can be higher than the maximum occupation rate $V_M$ of the ink composition in the first ink holder to the capacity of the first ink holder. The maximum occupation rate $V_C$ can be 80% or more, and further be 90% or more.

2.1.2. Color Ink Composition

The color ink composition is intended to be placed in the second liquid container, and contains a medium and a coloring material. The coloring material is a dye, or a pigment having an average particle size of 200 nm or less.

Coloring Material

If a dye is used, it may be selected from various types of dye generally used in ordinary ink jet recording apparatuses, such as direct dyes, acid dyes, food dyes, basic dyes, reactive dyes, disperse dyes, vat dyes, soluble vat dyes, and reactive disperse dyes.

If a pigment is used as the coloring material, the pigment has an average particle size of 200 nm or less. Examples of such a pigment include carbon blacks; azo pigments such as insoluble azo pigments, condensed azo pigments, azo lake, and chelate azo pigments; polycyclic pigments such as phthalocyanine pigments, perylene and perinone pigments, anthraquinone pigments, quinacridone pigments, dioxane pigments, thioindigo pigments, isoindolinone pigments, and quinophthalone pigments; and nitro pigments, nitroso pigments, and hollow resin particles.

The average particle size of the pigment is represented in a volume basis and can be measured with a particle size distribution analyzer based on a laser diffraction/scattering method. The particle size distribution analyzer may be based on dynamic light scattering. More specifically, the particle size distribution analyzer may be Microtrac UPA or Nanotrac UPA-EX 150 (each manufactured by Nikkiso), ELSZ-2 or DLS-8000 (each manufactured by Otsuka Electronics), or LB-550 (manufactured by Horiba).

The particles of the pigment may be surface-treated or the pigment is used with a dispersant, from the viewpoint of enhancing the dispersibility of the pigment.

In the pigment whose particles have been surface-treated, a hydrophilic group, such as a carboxy or sulfonate group, is directly or indirectly bound to the surfaces of the pigment particles by physical treatment or chemical treatment. This surface-treated pigment may be referred to as self-dispersing pigment.

When the pigment is used with a dispersant, the pigment is in the form of a dispersion containing a surfactant or a resin as a dispersant, and this may be referred to as polymer-dispersed pigment. The surfactant or the resin can be selected from among known substances. A pigment whose particles are coated with a resin may be used as a polymer-dispersed pigment. The pigment whose particles are coated with a resin can be prepared by acid precipitation, phase inversion emulsification, or miniemulsion polymerization.

The coloring material content can be set as needed. For example, it may be 1% to 20% by mass, such as 1% to 10% by mass, relative to the total mass of the color ink composition.

Medium

The medium used in the color ink composition functions as the dispersion medium of the dye or the pigment. The medium may be an aqueous medium mainly containing water, or a non-aqueous medium mainly containing an organic solvent. The organic solvent may be any one of the organic solvents cited in the above "1.2.3. Other Constituents".

The medium content can be set as needed. For example, it may be 50% by mass or more, such as 70% by mass or more, relative to the total mass of the color ink composition.

Other Constituents

In an embodiment, the color ink composite may further contain some of the constituents described in the above "1.2.3. Other Constituents" from the viewpoint of improving the capability of the color ink composition.

3. Liquid Consuming Unit

The liquid container of an embodiment of the invention will be connected to a liquid consuming unit. The liquid consuming unit may be a known ink jet recording apparatuses, such as an ink jet printer.

The liquid container can discharge hydrogen gas generated from the ink composition. It is thus prevented that hydrogen is carried to the head or other portions of the ink jet recording apparatus by the flowing ink composition when the ink composition is supplied to the ink jet recording apparatus. Consequently, ink ejection failure or other problems resulting from hydrogen gas can be prevented, and the ink jet recording apparatus can stably eject the ink composition.

4. Examples

The above-described embodiments of the invention will now be further described in detail with reference to Examples and Comparative Examples. However, the invention is not limited to the Examples.

4.1. Preparation of Ink Compositions

Water-resistant aluminum pigment dispersions A to C were prepared through the following steps (a) to (d), and then, ink compositions 1 to 3 were prepared using these pigment dispersions.

4.1.1. Water-Resistant Aluminum Pigment Dispersion

Step (a)

A resin coating liquid containing 3.0% by mass of cellulose acetate butyrate (butyration degree: 35% to 39%, produced by KANTO CHEMICAL) and 97% by mass of diethylene glycol diethyl ether (produced by Nippon Nyukazai) was uniformly applied onto a 100 μm thick PET film by a bar-coating method. The coating liquid was dried at 60° C. for 10 minutes to form a resin coating on the PET film. Subsequently, a vapor-deposited aluminum layer having an average thickness of 20 nm was formed on the resin coating using a vacuum vapor deposition apparatus VE-1010 (manufactured by VACUUM DEVICE INC.). Then, the resulting multilayer composite was subjected to peeling, pulverization and dispersion simultaneously in diethylene glycol diethyl ether using an ultrasonic dispersion apparatus VS-150 (manufactured by AS ONE Corporation). Thus an aluminum pigment dispersion was prepared which had been subjected to ultrasonic dispersion for 12 hours in total time. The resulting aluminum pigment dispersion was filtered through a SUS mesh filter with openings of 5 μm to remove coarse particles. Subsequently, the filtrate was placed in a round-bottom flask, and diethylene glycol diethyl ether was evaporated using a rotary evaporator. Thus the aluminum pigment dispersion was concentrated. Then, the concentration of the aluminum pigment dispersion was adjusted to yield an aluminum pigment dispersion containing 5.0% by mass of aluminum pigment.

Step (b)

Then, 5 parts by mass of the resulting aluminum pigment dispersion (0.25 parts by mass of aluminum pigment) was placed in a beaker, and 0.57 part by mass of tetraethoxysilane (TEOS) and 0.1 part by mass of 1 mol/L ammonia water were added to the aluminum pigment dispersion. The mixture was stirred at room temperature for one day for hydrolysis and condensation. Thus, the particles of the aluminum pigment were covered with a silica coating, and an aluminum pigment dispersion containing a water-resistant aluminum pigment was obtained.

Step (c)

The resulting aluminum pigment dispersion was centrifuged at 10,000 rpm for 60 minutes, and at least part of the supernatant, or the diethylene glycol diethyl ether of the aluminum pigment dispersion, was removed.

Step (d)

Subsequently, water-resistant aluminum pigment dispersion A was prepared by adding ion exchanged water and triethanolamine to the product of Step (c) and agitating the mixture at room temperature for one day. The water-resistant aluminum pigment dispersion A thus prepared contained 5.0% by mass of water-resistant aluminum pigment, 93.4% by mass of water, and 1.6% by mass of triethanolamine.

Also, water-resistant aluminum pigment dispersion B was prepared in the same manner as water-resistant aluminum pigment dispersion A, except that: the amount of TEOS added in Step (b) was 1.14 parts by mass; and the reaction was performed for 7 days.

Similarly, water-resistant aluminum pigment dispersion C was prepared in the same manner as water-resistant aluminum pigment dispersion A, except that: the amount of TEOS added in Step (b) was 1.14 parts by mass; the reaction was performed for 30 days; and triethanolamine was added in an amount in which its content would be 0.4% by mass.

4.1.2. Ink Composition

According to the compositions shown in Table 1, a water-resistant aluminum pigment dispersion, 1,2-hexanediol, propylene glycol, 2-pyrrolidone, OLFINE E1010 (acetylene glycol-based surfactant, produced by Nissin Chemical Industry), triethanolamine, and ion exchange water were mixed and agitated. Thus, ink compositions (inks) 1 to 3 shown in Table 1 were prepared.

TABLE 1

| Composition | | Ink 1 | Ink 2 | Ink 3 |
|---|---|---|---|---|
| Water-resistant aluminum pigment dispersion (solid content) | A | 1.7 | | |
| | B | | 1.7 | |
| | C | | | 1.7 |
| 1,2-Hexanediol | | 5 | 5 | 5 |
| Propylene glycol | | 40 | 40 | 40 |
| 2-Pyrrolidone | | 5 | 5 | 5 |
| Olfine E1010 | | 1 | 1 | 1 |
| Triethanolamine | | 1.6 | 1.6 | 0.4 |
| Ion exchanged water | | Balance | Balance | Balance |
| Total (mass %) | | 100 | 100 | 100 |
| Hydrogen generation P1 from pigment ($cm^3 \cdot g^{-1} \cdot day^{-1}$) | | 1 | 1.6 | 0.05 |

4.2. Measurement of Amount of Hydrogen Generated from Pigment

The amount of hydrogen generated from the pigment in each ink was measured by the Archimedian method. The preparation and measurement of samples were performed under the conditions of room temperature (25° C.), normal pressure (1 atmosphere), and normal humidity (65% RH). The lower limit of the measurement by the Archimedian method is 0.3 $cm^3$, and measurement values lower than this lower limit were considered to be 0 $cm^3$.

First, 5 g of each of the inks 1 to 3 was weighed out, and the aliquots were enclosed in the respective black ink bags of an ink jet printer PX-H 10000. Each ink bag was immediately and completely immersed in 250 mL of pure water in a graduated cylinder with the ink bag folded lightly, and the level of the water was read to measure the increase p1 (mL) in volume. After making sure of the p1 value, the ink bag was taken out and stored for 24 hours. Then, the ink bag was again immersed completely in water in the graduated cylinder, and the increase p2 (mL) in volume was measured.

The difference between p1 and p2, (p2−p1), corresponds to the amount ($cm^3 \cdot day^{-1}$) of hydrogen generated from the pigment. Then, the amount ($cm^3 \cdot day^{-1}$) of generated hydrogen was divided by the weight of the pigment contained in 5 g of the ink in the ink bag to obtain the amount P1 ($cm^3 \cdot g^{-1} \cdot day^{-1}$) of hydrogen generated per day from 1 g of the pigment. The values thus calculated are shown in Table 1.

The black ink bag of the ink jet printer PX-H 10000 includes an aluminum layer having a thickness of 5 μm or more and does not allow hydrogen gas to permeate therethrough. The black ink bag may be replaced with another ink bag having substantially the same hydrogen gas permeability.

4.3. Evaluations

The following evaluations were performed under the conditions of room temperature (25° C.), normal pressure (1 atmosphere) and normal humidity (65% RH).

4.3.1. Evaluation 1

In Evaluation 1, each of the inks was stored in an ink bag for a short time, and then the amount of hydrogen remaining in the ink bag was measured by the Archimedian method.

More specifically, ink bags each containing 100 g of any one of the inks were prepared and sealed for Examples and Comparative Examples according to the combinations shown in Table 2. Each ink bag was immediately and completely immersed in 250 mL of pure water in a graduated cylinder with the ink bag folded lightly, and the level of the water was read to measure the increase q1 (mL) in volume. After making sure of the q1 value, the ink bag was taken out and stored for 24 hours. Then, the ink bag was again immersed completely in water in the graduated cylinder, and the increase q2 (mL) in volume was measured. The difference between q1 and q2, (q2−q1), corresponds to the amount Q1 ($cm^3$) of hydrogen remaining in the ink bag after one day. The values thus calculated are shown in Table 2.

Table 2 also shows together the amount Q2 ($cm^3 \cdot day^{-1}$) of hydrogen generated for a short time (one day) and the amount Q3 ($cm^3 \cdot day^{-1}$) of hydrogen having permeated for a short time. The amount Q2 ($cm^3 \cdot day^{-1}$) of hydrogen generated for a short time is the product of the P1 value calculated in "4.2. Measurement of Amount of Hydrogen Generated from Pigment" and the weight of the pigment in the ink bag. The amount Q3 ($cm^3 \cdot day^{-1}$) of permeated hydrogen is the difference between the amount Q2 ($cm^3 \cdot day^{-1}$) of hydrogen generated from the ink for a short time and the amount Q1 ($cm^3$) of hydrogen remaining in the ink bag after one day, (Q2−Q1).

Ink bags A to C each had a thickness of 100 μm, and the portion that comes in contact with the ink had a surface area of 160 cm². More specifically, ink bag A included a nylon layer and a polyethylene layer that were bonded together with an adhesive. Ink bag B included an ethylene-vinyl acetate copolymer layer, a nylon layer and a polyethylene layer that were bonded together with an adhesive. Ink bag C was the black ink bag of the ink jet printer PX-H 10000 mentioned above, and included an aluminum layer having a thickness of 5 μm or more.

4.3.2. Evaluation 2

In Evaluation 2, the ink was stored in an ink bag for a long time, and then the amount of hydrogen generated in the ink bag was measured by the Archimedian method.

More Specifically, the amount R1 (cm³) of hydrogen remaining in the ink bag after 60 days was calculated in the same manner as in "4.3.1. Evaluation 1", except that the ink bag was stored for 60 days. The values thus calculated are shown in Table 2.

Table 2 also shows together the amount R2 (cm³) of hydrogen remaining after 60 days and the amount R3 (cm³) of hydrogen having permeated for 60 days. The amount R2 (cm³) of hydrogen generated for a long time (60 days) is the product of the Q2 value calculated in "4.3.1. Evaluation 1" and the storage time (60 days). The amount R3 (cm³) of permeated hydrogen for 60 days is the difference between the amount R2 (cm³) of hydrogen generated from the ink for a long time and the amount R1 (cm³) of hydrogen remaining in the ink bag after one day, (R2−R1).

4.3.3. Evaluation 3

In Evaluation 3, the percentage of water vapor that had released from the ink bag containing the ink was measured.

More specifically, ink bags containing 100 g of an ink were prepared and sealed for Examples and Comparative Examples according to the combinations shown in Table 2, and were stored for 24 hours. The difference between the mass of the ink gag before and after the storage was obtained, and the percentage (%) of water vapor that had permeated for a short time (one day) was determined by calculating the percentage of the difference in the mass of the ink bag to the mass of the entire water in the ink immediately after preparation. The values thus obtained were shown in Table 2. Evaluation criteria are as follows:

Good: The percentage of water vapor having permeated per day was 0.5% or less; and Bad: The percentage of water vapor having permeated per day was more than 0.5%.

4.3.4. Evaluation 4

In Evaluation 4, it was evaluated how much the ink in the ink bag was agitated when the ink bag was incorporated into an ink cartridge.

More specifically, ink bags B and C each containing 100 g of the corresponding ink were prepared and sealed according to the combinations shown in Table 3. After being stored for 60 days, each ink bag was placed in an enclosure as shown in FIG. 1 to prepare an ink cartridge.

After 60 days had elapsed, the ink cartridge was held by hand in a horizontal position, and shaken 20 times with a shaking width of about 10 cm in the longitudinal direction thereof for agitation. Then, the ink cartridge was held upside down and was shaken again 20 times for agitation.

The effect of agitation was evaluated as below. After agitation, aliquots of the ink, each in an amount of 10% of the initial amount of the ink in the ink bag, were taken one after another from the upper portion of the ink with a pump, and the rest of about 100 mL was left. Then, 1 g of each aliquot was taken out and diluted to 1000 times, and the thus prepared samples were measured for absorbance. More specifically, the absorbance of each diluted sample was measured at a wavelength of 500 nm with a spectrophotometer U-3300 manufactured by Hitachi.

For evaluation of the effect of agitation, the ratio of the absorbance of the sample to the absorbance of the ink composition in the initial state (in which metal pigment particles were sufficiently dispersed with a concentration of 10%) was calculated. The absorbance ratio was thus calculated for each sample, in which the absorbance was varied by the settling of the metal pigment, and the difference in absorbance ratio (highest absorbance ratio−lowest absorbance ratio) was evaluated. A large difference implies insufficient agitation.

Absorbance ratio [%]={(absorbance of sample)/(absorbance of ink in the initial state)}×100

Evaluation criteria are as follows, and the results are shown in Table 3:

Excellent: less than 5%;
Good: 5% or more to less than 10%; and
Poor: 10% or more.

4.3.5. Evaluation Results

The results of the above evaluations are shown in Tables 2 and 3.

TABLE 2

|  |  | Example 1 | Example 2 | Example 3 | Example 4 | Comparative Example 1 | Comparative Example 2 | Comparative Example 3 |
|---|---|---|---|---|---|---|---|---|
| Ink used |  | Ink 2 | Ink 3 | Ink 1 | Ink 2 | Ink 1 | Ink 1 | Ink 2 |
| Ink bag used |  | BagB | Bag B | Bag A | Bag A | Bag B | Bag C | Bag C |
| Evaluation 1 | Remaining hydrogen Q1 (cm³) after 1 day | 0 | 0 | 0 | 0 | 1.4 | 17 | 2.7 |
|  | Short-time generated hydrogen Q2 (cm³ · day⁻¹) | 2.72 | 0.085 | 17 | 2.72 | 17 | 17 | 2.72 |
|  | Permeated hydrogen Q3 (cm³ · day⁻¹) | 2.72 | 0.085 | 17 | 2.72 | 15.6 | 0 | 0 |
| Evaluation 2 | Remaining hydrogen R1 (cm³) after 60 day | 0 | 0 | 0 | 0 | 85 | (Broke) | (Broke) |
|  | Long-time generated hydrogen R2 (cm³) for 60 days | 0 | 0 | 0 | 0 | 1020 | 1020 | 162 |
|  | Permeated hydrogen R3 (cm³) for 60 days | 163.2 | 5.1 | 1020 | 163.2 | 935 | (Broke) | (Broke) |
| Evaluation 3 | Permeated water vapor (% · day⁻¹) | 0.15 | 0.15 | 1 | 1 | 0.15 | 0 | 0 |
|  | Judgment | Good | Good | Bad | Bad | Good | Good | Good |

TABLE 3

|  |  | Reference Example 1 | Reference Example 2 | Reference Example 3 |
|---|---|---|---|---|
| Ink used | | Ink 3 | Ink 3 | Ink 3 |
| Ink bag used | | Bag B | Bag B | Bag C |
| Contained ink volume (mL) | | 600 | 700 | 600 |
| Ink occupation (%) | | 86 | 100 | 86 |
| Evaluation 4 | Highest absorbance ratio | 100 | 111 | 101 |
| | Lowest absorbance ratio | 96 | 85 | 93 |
| | Difference (highest ratio − lowest ratio) | 4 | 26 | 8 |
| | Judgment | Excellent | Poor | Good |

Table 2 shows that the ink bags of Examples 1 to 3 can discharge hydrogen.

On the other hand, the ink bag of Comparative Example 1 did not sufficiently discharge hydrogen generated therein. In particular, when the ink bag was stored for a long time, it was considerably deformed.

Also, the ink bags of Comparative Examples 2 and 3 did not sufficiently discharge hydrogen generated therein. In particular, when the ink bags were stored for a long time, they were broken.

The invention is not limited to the above-described embodiments and Examples, and various modifications may be made. For example, the invention includes substantially the same form as the disclosed embodiments (for example, a form including the same function and method and producing the same result, or a form having the same intent and producing the same effect). Some elements unessential to the form of the disclosed embodiment may be replaced. The form of an embodiment of the invention includes an element producing the same effect or achieving the same object, as the form of the disclosed embodiments. The forms of the disclosed embodiments may be combined with the known art.

What is claimed is:

1. A liquid container that can be connected to a liquid consuming unit, the liquid container comprising:
    an ink composition containing an aqueous medium and a water-resistant metal pigment that includes pigment particles whose surfaces are covered with a coating and reacts with the aqueous medium to generate hydrogen gas;
    an ink holder containing the ink composition; and
    an ink delivering portion through which the ink composition flows out of the ink holder,
    wherein the amount of hydrogen gas generated per day from the ink composition in the ink holder is lower than or equal to the amount of hydrogen gas permeating per day through the ink holder, in an environment of 25° C.

2. The liquid container according to claim 1, wherein the amount of generated hydrogen measured by an Archimedian method is in the range of 0.01 to 2 $cm^3 \cdot day^{-1}$.

3. The liquid container according to claim 1, wherein the ink composition has a water content, and the water content is reduced in the ink holder by 0.01% to 0.05% per day at 25° C., relative to the initial water content on a mass basis immediately after the ink holder is charged with the ink composition.

4. The liquid container according to claim 1, wherein at least part of the ink holder is formed with a film having a thickness in the range of 50 to 300 μm without including an aluminum layer having a thickness of more than 5 μm.

5. The liquid container according to claim 4, wherein the film includes a layer that allows water to permeate therethrough in an amount in the range of 0.0001 to 0.0032 $mL/cm^2$ per day at 25° C., and allows hydrogen to permeate therethrough in an amount in the range of 0.005 to 0.15 $mL/cm^2$ per day at 25° C.

6. The liquid container according to claim 4, wherein the film includes a polyethylene layer and a nylon layer.

7. The liquid container according to claim 6, wherein the film further includes an aluminium oxide layer or an ethylene-vinyl acetate copolymer layer.

8. The liquid container according to claim 1, wherein the metal pigment has a 50% average particle size of 0.3 μm or more in terms of equivalent circle diameter, and the ink composition occupies the ink holder with a maximum occupation rate of 95% or less relative to the capacity of the ink holder.

9. A liquid container set comprising:
    the liquid container as set forth in claim 1; and
    a color liquid container including an color ink composition, a color ink holder containing the color ink composition, and a color ink delivering portion through which the color ink composition flows out of the color ink holder,
    wherein the color ink composition contains one of a pigment having an average particle size of 200 nm or less and a dye, and a medium.

10. A liquid container set comprising:
    the liquid container as set forth in claim 2; and
    a color liquid container including an color ink composition, a color ink holder containing the color ink composition, and a color ink delivering portion through which the color ink composition flows out of the color ink holder,
    wherein the color ink composition contains one of a pigment having an average particle size of 200 nm or less and a dye, and a medium.

11. A liquid container set comprising:
    the liquid container as set forth in claim 3; and
    a color liquid container including an color ink composition, a color ink holder containing the color ink composition, and a color ink delivering portion through which the color ink composition flows out of the color ink holder,
    wherein the color ink composition contains one of a pigment having an average particle size of 200 nm or less and a dye, and a medium.

12. A liquid container set comprising:
    the liquid container as set forth in claim 4; and
    a color liquid container including an color ink composition, a color ink holder containing the color ink composition, and a color ink delivering portion through which the color ink composition flows out of the color ink holder,
    wherein the color ink composition contains one of a pigment having an average particle size of 200 nm or less and a dye, and a medium.

13. A liquid container set comprising:
    the liquid container as set forth in claim 5; and
    a color liquid container including an color ink composition, a color ink holder containing the color ink composition, and a color ink delivering portion through which the color ink composition flows out of the color ink holder,
    wherein the color ink composition contains one of a pigment having an average particle size of 200 nm or less and a dye, and a medium.

14. A liquid container set comprising:
    the liquid container as set forth in claim 6; and
    a color liquid container including an color ink composition, a color ink holder containing the color ink composition, and a color ink delivering portion through which the color ink composition flows out of the color ink holder, wherein the color ink composition contains one of a pigment having an average particle size of 200 nm or less and a dye, and a medium.

15. A liquid container set comprising:
the liquid container as set forth in claim 7; and
a color liquid container including an color ink composition, a color ink holder containing the color ink composition, and a color ink delivering portion through which the color ink composition flows out of the color ink holder, wherein the color ink composition contains one of a pigment having an average particle size of 200 nm or less and a dye, and a medium.

16. A liquid container set comprising:
the liquid container as set forth in claim 8; and
a color liquid container including an color ink composition, a color ink holder containing the color ink composition, and a color ink delivering portion through which the color ink composition flows out of the color ink holder, wherein the color ink composition contains one of a pigment having an average particle size of 200 nm or less and a dye, and a medium.

17. The liquid container set according to claim 9, wherein at least part of the color ink holder is formed with a film including an aluminum layer having a thickness of 5 μm or more.

18. The liquid container set according to claim 9, wherein the ink composition occupies the ink holder with an occupation rate relative to the capacity of the ink holder, and the color ink composition occupies the color ink holder with an occupation rate relative to the capacity of the color ink holder, and wherein the maximum occupation rate of the color ink composition in the color ink holder is higher than the maximum occupation rate of the ink composition in the ink holder.

* * * * *